United States Patent [19]

Izuta

[11] Patent Number: 5,781,795
[45] Date of Patent: Jul. 14, 1998

[54] COMPUTER SYSTEM HAVING MEANS FOR SETTING KEYBOARD CONTROL INFORMATION AT SYSTEM INSTALLATION

[75] Inventor: Naoki Izuta, Kawasaki, Japan

[73] Assignee: Fujitsu Limited, Kanagawa, Japan

[21] Appl. No.: 436,640

[22] Filed: May 8, 1995

Related U.S. Application Data

[63] Continuation of Ser. No. 900,354, Jun. 18, 1992, abandoned.

[30] Foreign Application Priority Data

Jun. 19, 1991 [JP] Japan ............ 3-174417

[51] Int. Cl.⁶ .................................. G06F 13/00
[52] U.S. Cl. ............ 395/828; 395/830; 395/651; 395/652; 395/653; 395/284; 395/883; 395/884; 395/893
[58] Field of Search .................. 395/800, 836, 395/828, 651, 652, 653, 284, 882, 883, 881, 893, 830

[56] References Cited

U.S. PATENT DOCUMENTS

| | | | |
|---|---|---|---|
| 4,064,560 | 12/1977 | Baxter | 364/900 |
| 4,408,191 | 10/1983 | Fowler | 341/26 |
| 4,589,063 | 5/1986 | Shah et al. | 395/828 |
| 4,803,623 | 2/1989 | Klashka et al. | 395/828 |
| 4,964,075 | 10/1990 | Shaver et al. | 395/275 |
| 5,014,193 | 5/1991 | Garner et al. | 364/200.01 |
| 5,022,077 | 6/1991 | Bealkowski et al. | 380/4 |
| 5,056,057 | 10/1991 | Johnson et al. | 364/900 |
| 5,193,174 | 3/1993 | Bealkowski et al. | 395/500 |
| 5,214,785 | 5/1993 | Fairweather | 395/800 |
| 5,249,287 | 9/1993 | MacDonald et al. | 395/500 |
| 5,274,766 | 12/1993 | Long et al. | 395/275 |
| 5,278,958 | 1/1994 | Dewa | 395/836 |
| 5,323,153 | 6/1994 | Sonobe et al. | 341/20 |
| 5,341,316 | 8/1994 | Nishigaki | 364/709.12 |

FOREIGN PATENT DOCUMENTS

| | | |
|---|---|---|
| 64-65620 | 3/1989 | Japan. |
| 2-259920 | 10/1990 | Japan. |

*Primary Examiner*—Parshotam S. Lall
*Assistant Examiner*—Saleh Najjar
*Attorney, Agent, or Firm*—Nikaido, Marmelstein, Murray & Oram LLP

[57] ABSTRACT

A computer system wherein at the time of system installation, no matter what keyboard is used, the user can use that keyboard to proceed with the installation processing in the same way as when a standard keyboard is used. The computer system has a new internal storage medium, while a keyboard recognition and processing unit is formed in the existing RAM. The keyboard recognition and processing unit writes various types of keyboard control information in the above-mentioned RAM based on installation information read from an external storage medium and reads the keyboard ID from the above keyboard. The keyboard control information corresponding to the keyboard ID is selected from the various types of keyboard control information and is held in the internal storage medium. The ROM monitor part uses the keyboard control information in the internal storage to execute the installation processing.

11 Claims, 7 Drawing Sheets

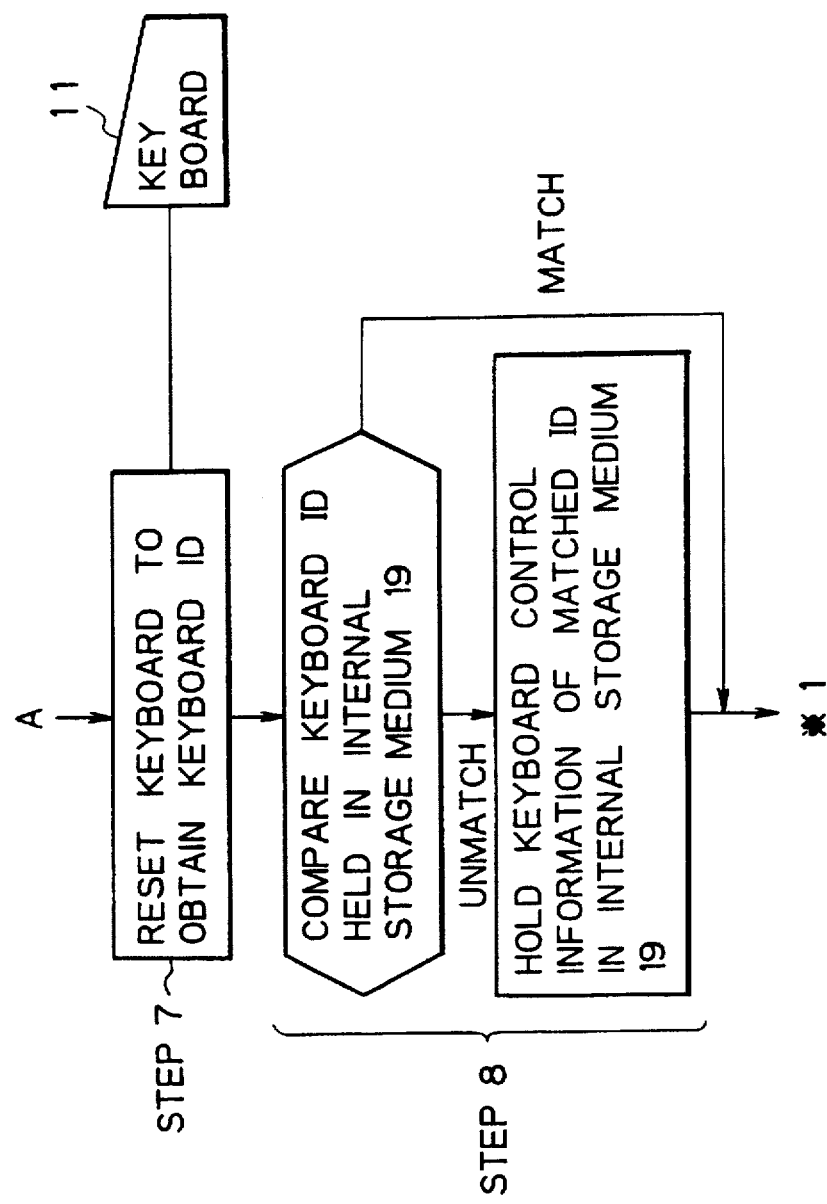

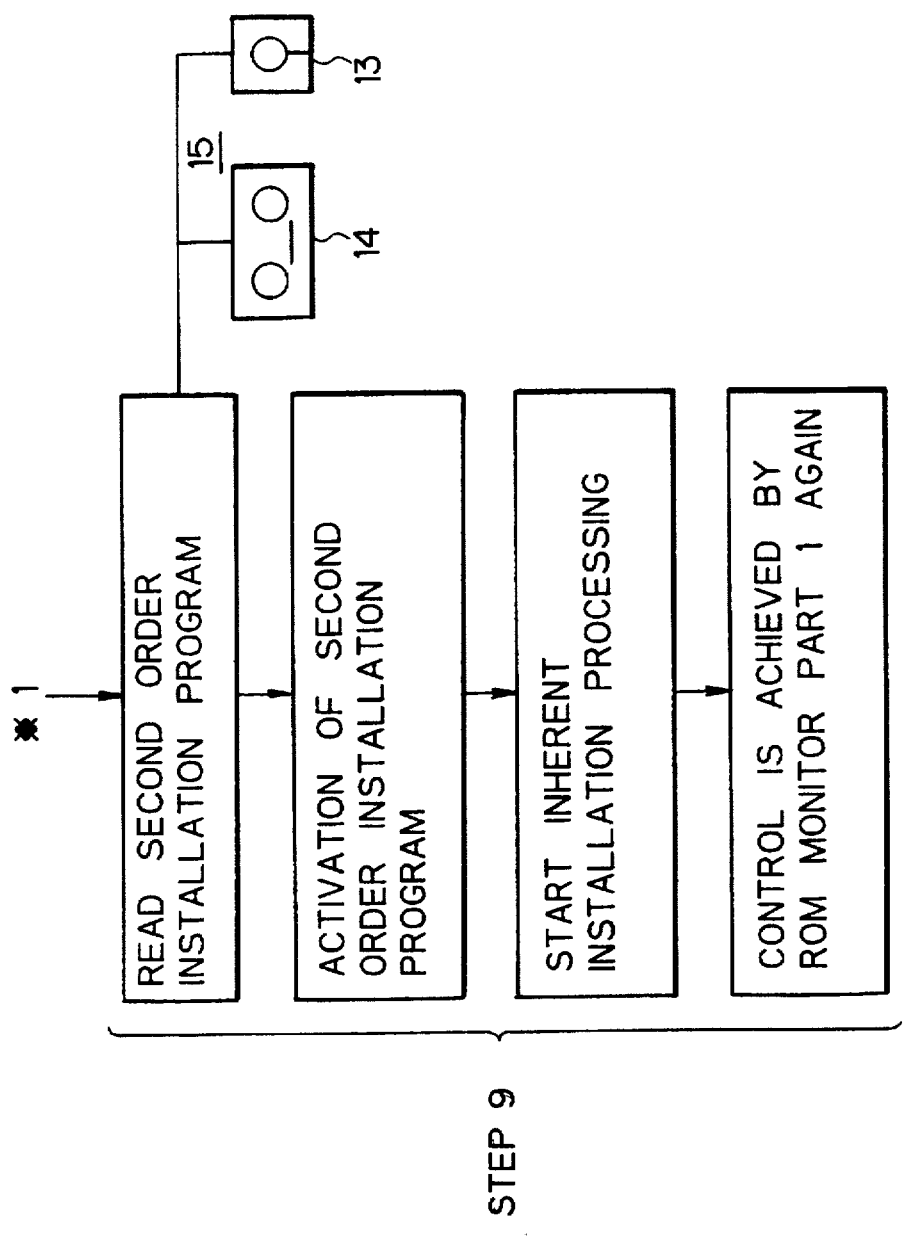

COMPUTER SYSTEM HAVING MEANS FOR SETTING KEYBOARD CONTROL INFORMATION AT SYSTEM INSTALLATION

This application is a continuation of application Ser. No. 07/900,354 filed Jun. 18, 1992 now abandoned.

BACKGROUND OF THE INVENTION

1. Field of the Invention

The present invention relates to a computer system having a means for setting the keyboard control information at the time of system installation.

Computer systems often have the system program, the so-called operating system (OS), loaded in the disk unit at the time of shipment. After computer systems are shipped out, however, it is sometimes necessary to modify the system program. So-called system installation is performed at the time of this modification. The reasons why the system program has to be modified in this way are as follows:

(a) In some cases the functions of the computer system have to be upgraded. In such cases, it is necessary to replace the original system program with a new system program in which the functions have been upgraded.

(b) In other cases a computer system exported to one country (for example, the U.S.) will be reexported to another country (for example, Japan) and be used in that other country. In such cases, the foreign language version (for example English version) system program has to be replaced with a system program of the other country's language.

The replacement of system programs is known as system installation.

System installation is performed in other cases as well. For example, when a system program is not loaded in a computer system at the time of shipment, system installation is performed at the time of use of the computer system. That is, the system program is loaded from an external magnetic tape, for example, to a disk unit.

In the above former case, that is, the case of replacing an installed system program, and in the above latter case, that is, the case where the system program must be installed initially, usually installation processing is performed. This installation processing is performed by activating a part of a ROM which is used only during installation and which is referred to as a read only memory (ROM) monitor (installation) part which is part of the ROM mounted in the hardware constituting the main part of the computer system.

This installation processing will be explained in a bit more detail below. The above-mentioned ROM monitor installation part used during installation first executes an installation use program, i.e., a so-called boot program. By the execution of this program, when the operator operates the keyboard, data is input to the main system unit from the keyboard, so the above-mentioned ROM installation part processes this input data. As an example of the keyboard operation, if assuming there are two disk units installed in the computer system, there is a keyboard operation to indicate which of the disk units to install on. As another example of the keyboard operation, when there is only one disk unit, there is a keyboard operation for instructing which partition of the partitions which the disk is divided into to install on.

Processing is performed based on the instructions from the keyboard and is echoed back to the display unit. Conversational processing with the operator is proceeded with.

The above-mentioned ROM monitor part is built in stationarily as part of the hardware constituting the main unit of the computer system. As opposed to this, the above-mentioned keyboard is not built in stationarily as part of the hardware. In general, various types of keyboards are made available. The user of the computer system often selects the keyboard best suited to himself so as to improve the operability of the system. Well known types of the above models are the "ASC type" and the "JIS" type.

The type of the keyboard can be changed later in this way, but this causes trouble for the computer system. This will be explained in detail below. After a system program is installed in a computer system and the system is activated, if a keyboard is supported by the system, then no trouble will occur even if that keyboard is connected to the system and the computer system will operate normally. If, however, a type of a keyboard other than the type of the keyboard, which the ROM installation part was made able to handle (i.e. check) at the time of shipment of the system, is newly connected to the system, the above-mentioned installation processing will no longer be normally executed. This is the problem mentioned above. In other words, since the data input from a keyboard not supported by the system is data which cannot be understood as is by the computer system, the above-mentioned installation processing will not proceed even if that data is input.

2. Description of the Related Art

In the past, in a personal computer, work station, or other computer system, the types of the keyboards which could be connected to the computer systems were designated in advance and the users were warned against using nondesignated keyboards. Therefore, data input from nondesignated keyboards could not be correctly recognized (i.e. check) by the ROM installation part of the ROM.

When a user requested use of a nondesignated keyboard, the computer system had to be modified so as to support the requested keyboard. One example of such a system modification is the revision of the content of the ROM mounted in the main unit of the computer system. A second example of the system modification is the provision to the user, for example, in the form of a paper list, of a translation table between the key array of the keyboard currently supported by the ROM and the key array of the keyboard which the user desires to newly connect. The user operates the keyboard while looking at this translation table. When the operator has to input, for example, the character "b" in the main unit of the system from the keyboard, the operator consults the translation table and sees that b→c in the translation table, so depresses the "c" marked key in the keyboard. On the display, however, the "c" is displayed.

In this way, according to the prior art, there was the problem that the old model computer systems could not support the new type of keyboards. Or, even if a new type of keyboard could be supported by use of the above-mentioned translation table, there was the problem of extreme inconvenient to the user and poor operability.

SUMMARY OF THE INVENTION

Therefore, the object of the present invention is to provide a computer system wherein, when a new keyboard which is not supported by the computer system is connected to the system, the input data can be correctly understood by the ROM monitor part of the main unit of the system by inputting the data as is in accordance with the letters, numerals, etc. shown by the keys of the new keyboard and therefore the processing by the ROM monitor part can be correctly executed and the letters and numerals input are displayed as is on the display unit in the system. That is, it has as its object the provision of a computer system having a means for setting keyboard control information at the system installation.

To attain the above object, the present invention basically is comprised as follows: First, an internal storage medium is provided in the main unit of the computer system. Here, the keyboard control information is stored together with the keyboard identification (ID) so as not to be erased disappear when power is removed. Further, a keyboard recognition and processing unit is created in the random access memory (RAM), for example, main memory, in the computer system. The keyboard recognition and processing unit reads from the keyboard the ID showing the type of the keyboard to which the computer system is connected and when the keyboard ID which is read does not coincide with the keyboard ID in the above-mentioned internal storage medium, holds keyboard control information corresponding to the keyboard ID from an external storage medium in the above-mentioned internal storage medium so that it does not disappear.

BRIEF DESCRIPTION OF THE DRAWINGS

The above object and features of the present invention will be more apparent from the following description of the preferred embodiments with reference to the accompanying drawings, wherein

FIGS. 5A and 5B are flow charts showing mainly an example of the series of processing performed by a keyboard recognition and processing unit 7 in a RAM 17 shown in FIG. 1.

DESCRIPTION OF THE PREFERRED EMBODIMENTS

Figure 1:
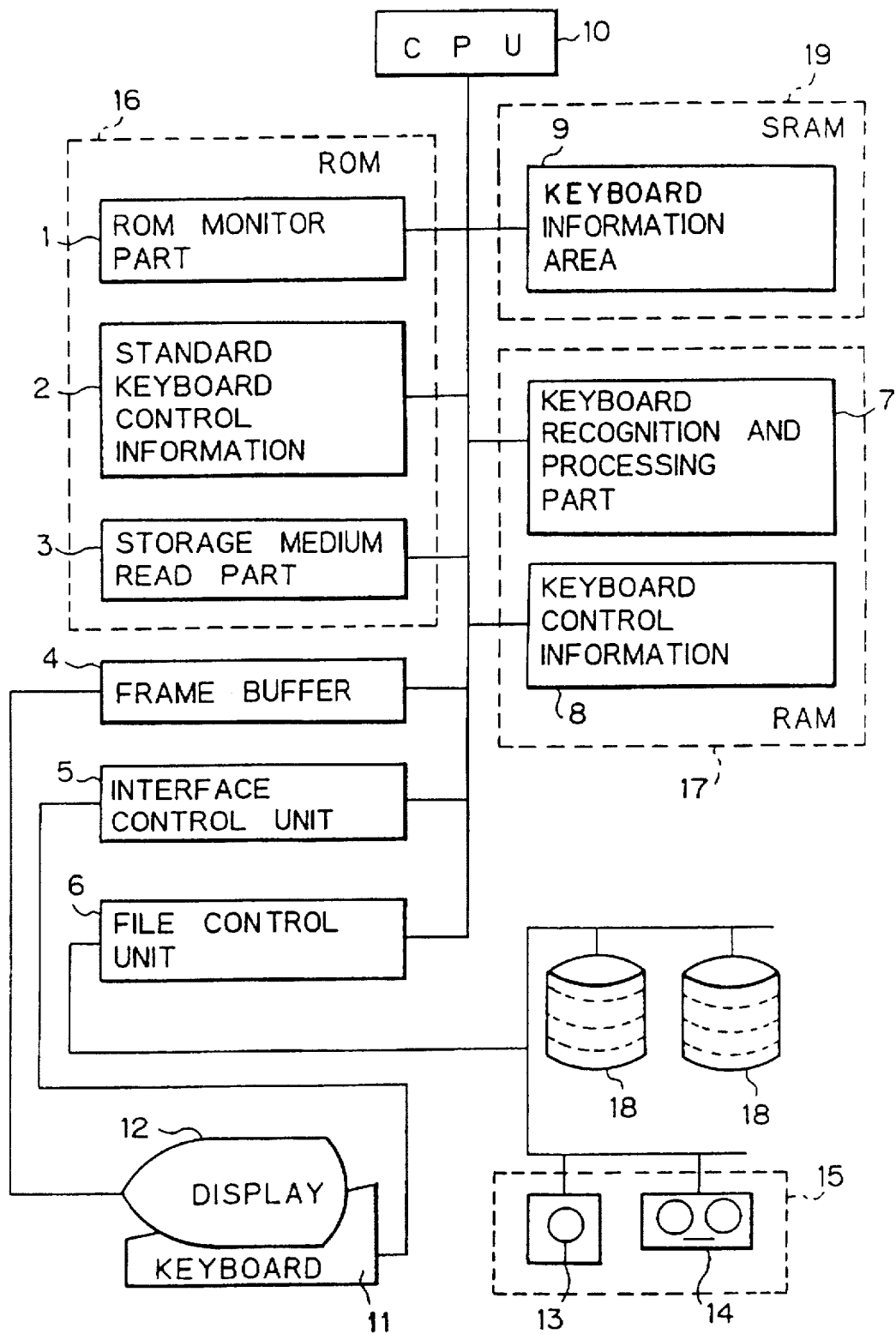
FIG. 1 is a block diagram of an embodiment of the computer system according to the present invention.

FIG. 1 is a block diagram of an embodiment of the computer system according to the present invention. In the figure, reference numeral 1 shows the ROM monitor part. Similarly, 2 shows a standard keyboard control information, 3 a storage medium data read part, 4 a frame buffer, 5 an interface control unit, 6 a file control unit, 7 a keyboard recognition and processing unit, 8 a keyboard control information, 9 a keyboard control information area, 10 a central processing unit (CPU), 11 a keyboard, 12 a display unit, for example, a CRT, 13 a floppy disk, 14 a magnetic tape, 15 an external storage medium comprised of a floppy disk and/or magnetic tape 14, 16 a read only memory (ROM) housing the above-mentioned constituent elements 1, 2, and 3, 17 a random access memory (RAM) housing, for example, the above constituent members 7 and 8, a main memory 18, and 19 an internal storage medium which includes the above-mentioned keyboard control areas and in which various types of system information are held. The storage medium 19 is for example comprised of a static RAM (SRAM) and is able to rewrite information to be stored. It is a nonvolatile member which is not erased even when the power is cut off.

The ROM monitor or installation part 1 in the ROM 16 displays on the display unit 12 a message of the system activation when the power is turned on. Further, the ROM monitor part 1 displays on the display unit 12 an indication requesting the depression of a specific predetermined key at the time of installation. When the specific key is pressed, the ROM monitor or installation part 1 activates the storage medium data read part 3.

Note that the keyboard recognition and processing program for operation of the keyboard recognition and processing unit 7 and the keyboard control information 8 stored in the RAM 17 are both preloaded in the external storage medium 15.

The operation under the present invention is as follows:

(1) When the power is turned on, the ROM monitor part 1 is activated and, at the time of installation, the ROM monitor part 1 displays on the display unit 12 the message indication "PRESS (SPECIFIED) KEY". Note that the specified key is set in advance.

(2) The operator depresses the key specified by the message indication. The ROM monitor part 1 activates the storage medium read part 3 in response to the depression of the key.

(3) The storage medium read part 3 writes in the RAM 17 the keyboard recognition and processing program (which realizes the keyboard recognition and processing unit 7 in the RAM 17) recorded at a predetermined position of the magnetic tape 14, for example, and the keyboard control information (which becomes the keyboard control information 8 in the RAM 17) through the file control unit 6.

When the write operation in the RAM 17 is completed, the keyboard recognition and processing unit 7 controls the system.

(4) The keyboard recognition and processing unit 7 issues a keyboard ID read command to the keyboard 11 currently installed with the computer system. In response to the command, the keyboard 11 sends its keyboard ID to the recognition and processing unit 7.

(5) The recognition and processing unit 7 accesses the keyboard control information 8 based on the above-mentioned received keyboard ID. That is, the keyboard control information 8 fetches a number of types of keyboard control information in the above (3) and selects out of these keyboard control information (sets) the keyboard control information corresponding to the keyboard ID.

The selected keyboard control information is written in the keyboard control information area 9 in the internal storage medium 19 by the recognition and processing unit 7 and is held there.

After this, the center of control of the system is changed once again from the recognition and processing unit 17 to the ROM monitor part 1.

(6) The ROM monitor part 1 reads the information once again from the external storage medium 15. The information is the program required for the inherent processing for installation in the system, that is, the installation program information and installation data. The system starts operating based on this information.

Note that in the above-mentioned (1), the specific key depressed is desirably one common to a number of types of keyboards. That is, the code output when the keys with the various marks are pressed on a certain keyboard "X" and the code output when the keys with the same marks are pressed on another keyboard "Y" do not match, but it is preferable to set things in advance so that, for example, if the same keys marked "BO" (abbreviation for BOOT) are pressed, a code expressing an installation instruction be given to the main system unit in common from both the keyboard "X" and the keyboard "Y". If this is done, the it becomes possible for the main system unit to recognize that an installation instruction has been sent from the new keyboard without referring to the keyboard control information of the new keyboard.

Therefore, even if new types of keyboards are connected to the main system unit, when the power is turned on, it is possible to recognize the keyboard ID of the keyboard and set the keyboard control information corresponding to the keyboard ID in the internal storage medium 19. Therefore, it is possible to correctly convey to the main system unit the code expressing as they are the keys indicated by the marks on the new keyboard.

The constitution shown in FIG. 1 will now be further explained. The standard keyboard control information 2 in the ROM 16 is the keyboard control information originally held as the standard for the computer system from the time of shipment. Therefore, if the standard keyboard is used, the matrix information (key code) output by depressing the keys of the keyboard 11 is referred to by the standard keyboard control information 2 as is and it is recognized which key on the keyboard the operator has pressed.

The frame buffer 4 is a memory for storing temporarily the data displayed on a display unit 12, for example, a CRT.

The interface control unit 5 performs the interface control between the keyboard 11 and the main system unit side and, for example, performs control under the RS232C interface standard.

The file control unit 6 performs control for accessing an external storage medium 15 comprised of a floppy disk 13 and/or magnetic tape 14 from the main system unit.

The keyboard recognition and processing unit 7, which operates in accordance with the keyboard recognition and processing program, reads the keyboard ID from the keyboard 11 connected to the main system unit and writes the keyboard control information inherent to the keyboard corresponding to the keyboard ID into a keyboard control information area 9 at a predetermined address in the internal storage medium 19.

To read the above-mentioned keyboard ID, the recognition and processing unit 7 issues a keyboard ID read command to the keyboard 11. In response to this command, a keyboard ID is sent as a code from the keyboard 11.

In general, the keyboard ID is maintained by the ROM or the DIP switches with each keyboard. To read it out, the above-mentioned keyboard ID read command is given to the keyboard 11. This command may for example be made jointly with the reset command. That is, when the microprocessor unit (MPU) housed in the keyboard 11 is reset, the MPU operates so as to output the keyboard ID.

The keyboard information 8 loaded from the medium unit 15 to the RAM 17 includes control tables for various types of keyboards.

Figure 2:
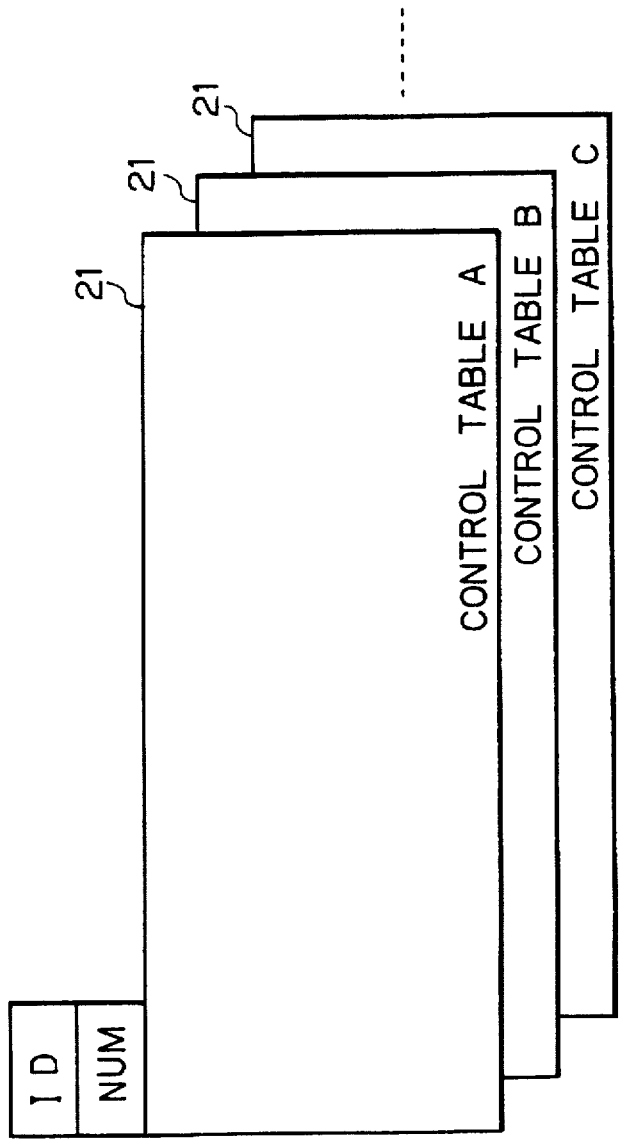
FIG. 2 is a format diagram for explaining the keyboard control information.

FIG. 2 is a format diagram for explaining the keyboard control information and shows illustratively the above-mentioned control tables. Specifically, it shows the keyboard ID ("ID"), the number ("NUM") of the control tables 21 included in the keyboard control information, and the control tables (in the figure, as one example, three control tables "A", "B", and "C").

The control table A is used in the case of a normal key operation. The control table B is used in the case of operation by depressing the shift key, for example. The control table C is used when operating by the control key.

In a keyboard used under UNIX, meta keys are provided for expansion of functions. A separate control table is provided for such a keyboard. The control table is used after a meta key is pressed.

When a key on the keyboard 11 is pressed, for example, one byte of matrix information (key code) is transferred to the main system unit. The above-mentioned control tables 21 translate the key codes which are sent into the corresponding character codes.

Figure 3:
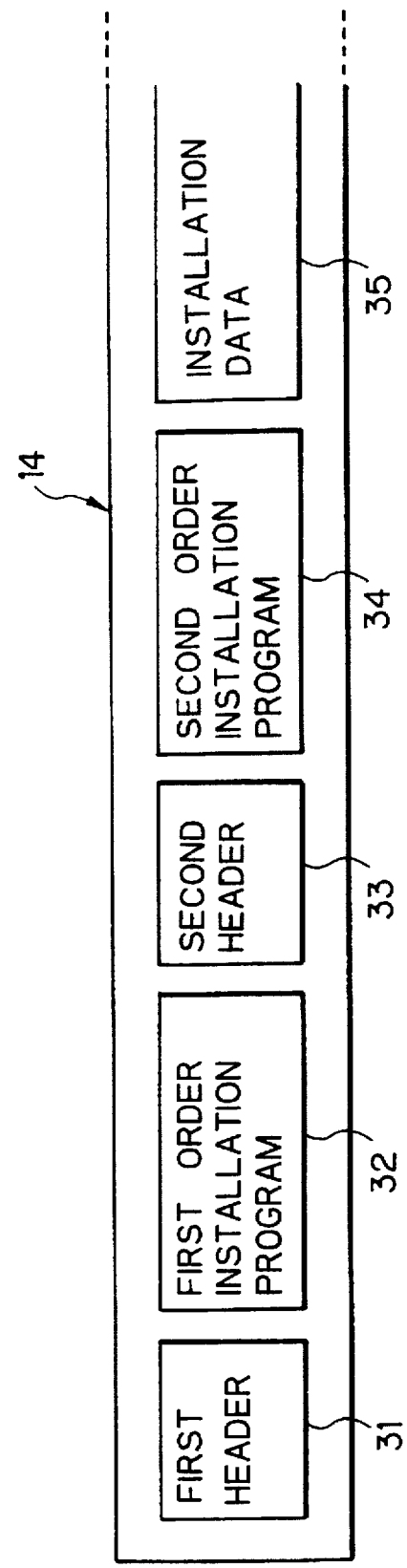
FIG. 3 is a view showing an example of the format of the installation information in an external storage medium.

FIG. 3 is a view showing an example of the format of the installation information in an external storage medium. In the example of this figure, installation information recorded on a magnetic tape 14 is shown. That is, the installation information read from the magnetic tape 14 includes a first header 31, a first order installation program 32, a second header 33, a second order installation program 34, installation data 35, etc.

In the first header 31 there are recorded the program length of the first order installation program 32, the message data for displaying the same, an activation offset address for the case of activating the first order installation program 32, etc.

In the first order installation program 32 there are recorded a keyboard recognition and processing program for realizing the keyboard recognition and processing unit 7 in the RAM 17, keyboard control information corresponding to the various types of keyboards and comprised of the formats illustrated in FIG. 2, a read processing program for reading the second order installation program 33, etc.

In the second header 33 there is recorded the program length of the second order installation program 34, the message data for displaying the same, an activation offset address for the case of activating the second order installation program 34, etc. Note that the second order installation program 34 is a program for executing the actual installation processing for the system. The processing is proceeded with in a conversational mode with the operator on the display 12.

Further, the installation data 35 which follows the second order installation program 34 shows the specific data which is installed.

Returning once again to FIG. 1, the keyboard control information is held in the keyboard control information area 9 in the internal storage medium 19. As already mentioned, various types of keyboard control information corresponding to the various types of keyboards are written in the keyboard control information 8 in the RAM 17. Among these, only the single keyboard control information which matches with the keyboard ID of the currently connected keyboard 11 is selected and is held in the keyboard control information area 9.

In the above-mentioned RAM 17, in addition to the above keyboard control information 8, a keyboard recognition and processing unit 7 which operates in accordance with the keyboard recognition and processing program held in the first order installation program 32 is formed.

Further, the internal storage medium 19 is comprised of memory which maintains its contents even when the power is cut off. For example, it may be the afore-mentioned SRAM backed up by a battery. Alternatively, it may consist of an $E^2PROM$.

Figure 4A:
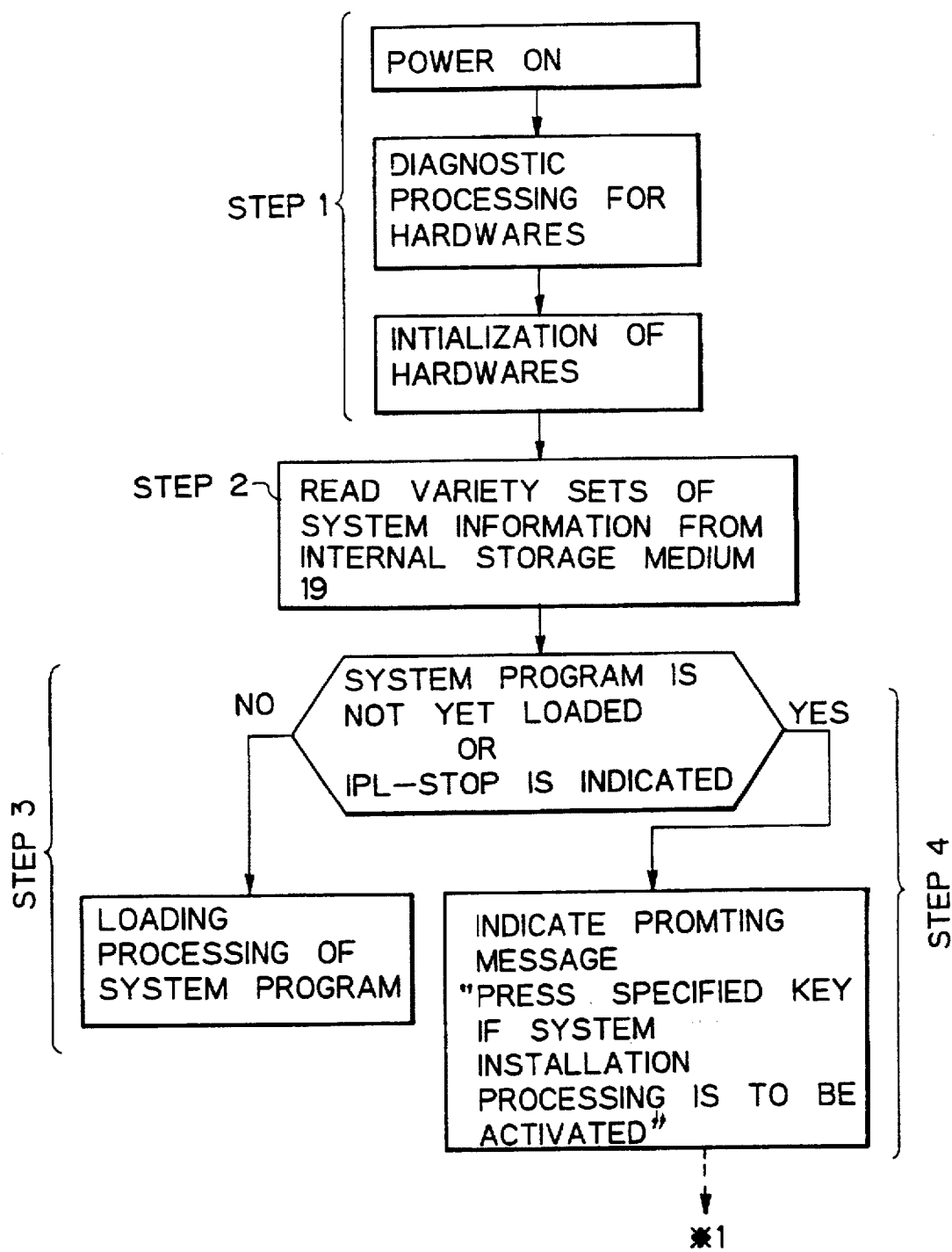
FIGS. 4A and 4B are flow charts showing an example of the series of processing performed by the ROM monitor part 1 shown in FIG. 1.
Figure 4B:
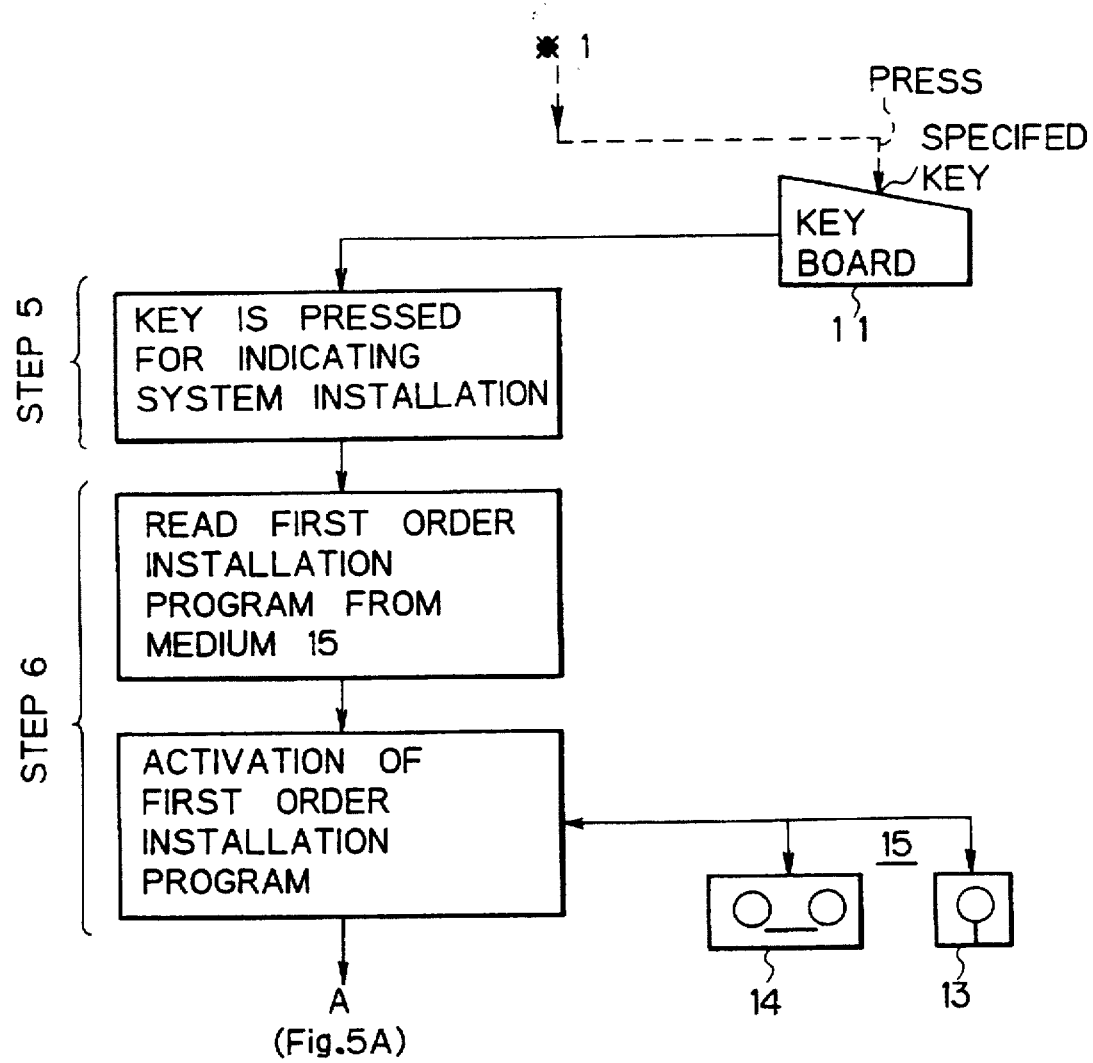

FIGS. 4A and 4B are flow charts showing an example of the series of processing performed by the ROM monitor part 1 shown in FIG. 1.

Step 1

When the power of the computer system is turned on, the processing by the ROM monitor part 1 is started.

The ROM monitor part 1 operates in accordance with a program which it holds and first performs diagnostic processing for the various hardware.

Further, the ROM monitor part 1 initializes the various types of hardware.

Step 2

The ROM monitor part 1 reads from the internal storage medium 19 the information for determining from which disk unit (18 in FIG. 1) to fetch the system program, i.e., operating system, from, the so-called IPL-STOP indication for putting off the input from the operator before the initial program loading (IPL) is started; the above-mentioned keyboard control information; and other system information.

Step 3

When the system program is loaded in the internal storage medium 19, loading processing is performed for loading the disk unit 18 with this.

Step 4

However, if the system program has not been loaded in the internal storage medium or if there is an IPL-STOP indication, the ROM monitor part 1 displays on the display unit 12 the prompting message "PRESS (SPECIFIED) KEY IF SYSTEM INSTALLATION PROCESSING IS TO BE ACTIVATED" and awaits input.

Step 5

The operator responds to the prompting message and presses the specified key so as to start the execution of the system installation processing.

Step 6

The ROM monitor part 1 starts the control by the storage medium read part 3 by the depression of the key. That is, the storage medium read part 3 starts reading the installation information shown in FIG. 3 from the medium unit 15.

First, the first header 31 is read. Based on the read data, the first order installation program 32 is read. As explained in FIG. 3, the first order installation program system includes the keyboard recognition and processing program (one realizing the keyboard recognition and processing unit 7 in the RAM 17) and keyboard control information (set in the keyboard control information 8 of the RAM 17). This information is sent to the RAM 17 and written there.

FIGS. 5A and 5B are flow charts showing mainly an example of the series of processing performed by a keyboard recognition and processing unit 7 in a RAM 17 shown in FIG. 1.

Step 7

The keyboard recognition and processing unit 7 issues a keyboard ID read command to the keyboard 11. The keyboard 11 is reset for this, for example. When the keyboard 11 is reset, it is set up to output its own keyboard ID.

Step 8

Further, the keyboard recognition and processing unit 7 compares the above-mentioned keyboard ID read from the keyboard 11 and the keyboard ID corresponding to the keyboard control information held in the keyboard control area 9 in the internal storage medium 19.

If the above two keyboard ID's match, the routine proceeds to the later mentioned STEP 9 (FIG. 5B).

If the above two keyboard ID's do not match, the routine proceeds through the following second half of STEP 8 to STEP 9.

The keyboard recognition and processing unit 7 selects from the keyboard control information 8 (as mentioned already, various types of keyboard control information is written) in the RAM 17 the keyboard control information corresponding to the keyboard ID read from the keyboard 11. Further, it moves this to the keyboard control information area 9 in the internal storage medium 19 and holds it there.

Note that the cases where the above-mentioned two keyboard ID's do not match include cases where no information is held in the keyboard control information area 9.

Step 9

The storage medium data read part 3 reads the second header 33 shown in FIG. 3 from the medium unit 15 and further reads the second order installation program 34. The second order installation program is activated and the installation data 35 shown in FIG. 3 is read. After this, the basic installation processing is started by the ROM monitor part 1.

Note that in the above-mentioned STEP 9, when no second header 33 or second order installation program 34 are held in the medium unit 15, the control by the ROM monitor part 1 is started directly after the end of the reading of the first header 31 and the first order installation program 32.

After the above STEP 9, the ROM monitor part 1 once again reads information for determining from which disk unit (18 in FIG. 1) to fetch the system program, i.e., the operating system, from the internal storage medium 19, the so-called IPL-STOP indication for awaiting input from the operator before starting the initial program loading (IPL), the above-mentioned keyboard control information, and other system information. The read keyboard control information is used to confirm if the keyboard ID matches. Then the routine proceeds to the processing for loading the system program and other processing.

After this, the keyboard control information in the internal storage medium 19 is used to enable correct recognition of the input data from the keyboard 11.

In the above embodiment, the program was divided into a first order installation program and a second order installation program for performing the actual installation processing, but it is also possible to use the first order installation program to perform the processing for setting the keyboard control information and the actual installation processing. Further, it is possible to provide a pseudo-installation medium for performing only the processing for setting the keyboard control information and to perform only the processing for setting the keyboard information.

Further, in the above-mentioned embodiment, in the above STEP 7, the keyboard recognition and processing unit 7 in the RAM 17 issues a keyboard ID read command to the keyboard 11 (the keyboard 11 is reset), but this resetting may also be performed by the ROM monitor part 1 at the above-mentioned STEP 2. In this case, the ROM monitor part 1 resets the keyboard 11 and the keyboard ID which is read by this is recorded in part of the RAM 17.

In this case, at STEP 8, the keyboard recognition and processing unit 7 is made to compare the above-mentioned keyboard ID recorded in part of the RAM 17 and the keyboard ID corresponding to the keyboard control information held in the keyboard control area 9 in the internal storage medium 19 (see STEP 8). The subsequent steps are the same as mentioned above.

As explained above, according to the present invention, even if a keyboard 11 other than the keyboard standard for the main system unit is connected to the main system unit, the keys input by the operator from the keyboard can be correctly interpreted by the ROM monitor part 1 and the corresponding letters and numerals can be displayed on the display unit 12. Therefore, there is no problem in operability by the operator in the subsequently performed conversational type installation processing.

I claim:

1. A computer system having a means for setting keyboard control information at system installation when system programs are replaced, said computer system comprising:
   a keyboard;
   a ROM having a ROM installation part which indicates a key to be pushed on a keyboard to activate a system installation processing on the computer system;

a random access memory (RAM) which temporarily stores the data generated in the computer system;

an external storage medium which stores installation information required for the installation processing;

an internal storage medium which stores keyboard control information and corresponding keyboard identifications (IDs); and a keyboard recognition and processing unit which is formed in said RAM and which during system installation a) reads said keyboard ID of said keyboard directly from said keyboard when power is turned on and, b) when recognizing that said keyboard ID does not coincide with the keyboard ID stored in the internal storage medium, reads the keyboard control information corresponding to the keyboard ID from said RAM and stores the read keyboard control information in the internal storage medium, and said ROM installation part accesses said keyboard control information stored inside said internal storage medium and starts the inherent installation processing based upon said stored keyboard control information.

2. A computer system as set forth in claim 1, wherein said keyboard recognition and processing unit reads the keyboard ID directly from the keyboard.

3. A computer system as set forth in claim 1, wherein said ROM installation part reads said keyboard ID directly from said keyboard and records the same in said RAM.

4. A computer system as set forth in claim 1, wherein said installation information includes a keyboard ID read command for reading the keyboard ID from the said keyboard.

5. A computer system as set forth in claim 4, wherein said keyboard read command is a reset command issued to the said keyboard.

6. A computer system as set forth in claim 1, wherein said installation information includes in advance various types of keyboard control information corresponding to various types of keyboards.

7. A computer system as set forth in claim 6, wherein the various types of keyboard control information are all once written in the RAM and the one keyboard ID corresponding to the keyboard which matches with the keyboard ID from said keyboard is selected from these by said keyboard recognition and processing unit and held in said internal storage medium.

8. A computer system as set forth in claim 1, wherein said keyboard recognition and processing unit is realized by a keyboard recognition and processing program and wherein the keyboard recognition and processing program is included in advance in said installation information.

9. A computer system as set forth in claim 1, wherein said installation information includes an installation program and installation data for executing the inherent installation processing.

10. A system as set forth in claim 1, wherein said internal storage medium consists of an EPROM or a battery backed up SRAM.

11. A system as set forth in claim 1, wherein the key on the keyboard to be depressed to respond to a message prompting said installation when the power is turned on is made a single key common to a plurality of keyboards and wherein when the common key is pushed, a code expressing the installation instructions is input to the main system unit no matter what type of keyboard.

* * * * *